US010367696B2

United States Patent
Aström et al.

(10) Patent No.: US 10,367,696 B2
(45) Date of Patent: Jul. 30, 2019

(54) AUTOMATIC NETWORK MANAGEMENT SYSTEM AND METHODS

(71) Applicant: Telefonaktiebolaget LM Ericsson (publ), Stockholm (SE)

(72) Inventors: Bo Aström, Stockholm (SE); Jan Friman, Karlskrona (SE); Bulent Gecer, Saltsjö-Boo (SE); Jan Lemark, Stockholm (SE); Christoph Meyer, Herzogenrath (DE); Maria Belen Pancorbo Marcos, Madrid (ES); John Quilty, Athlone (IE); Stephen Terrill, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 482 days.

(21) Appl. No.: 15/108,826

(22) PCT Filed: May 23, 2016

(86) PCT No.: PCT/SE2016/050473
§ 371 (c)(1),
(2) Date: Jun. 29, 2016

(87) PCT Pub. No.: WO2017/204699
PCT Pub. Date: Nov. 30, 2017

(65) Prior Publication Data
US 2017/0339023 A1   Nov. 23, 2017

(51) Int. Cl.
*G06F 15/173* (2006.01)
*H04L 12/24* (2006.01)
*H04L 12/26* (2006.01)

(52) U.S. Cl.
CPC .......... *H04L 41/16* (2013.01); *H04L 41/0893* (2013.01); *H04L 41/0896* (2013.01);
(Continued)

(58) Field of Classification Search
CPC . H04L 41/16; H04L 41/0893; H04L 41/0896; H04L 41/14; H04L 41/0886;
(Continued)

(56) References Cited

U.S. PATENT DOCUMENTS

| 2013/0046819 A1* | 2/2013 | Bocirnea | H04Q 9/00 709/203 |
| 2013/0267209 A1* | 10/2013 | Bott | H04W 4/16 455/414.1 |

(Continued)

FOREIGN PATENT DOCUMENTS

| EP | 2518942 A1 | 10/2012 |
| WO | 2013072232 A1 | 5/2013 |
| WO | 2015191965 A2 | 12/2015 |

OTHER PUBLICATIONS

International Search Report and Written Opinion dated Jan. 23, 2017 in International Application No. PCT/SE2016/050473, 14 pages.

(Continued)

*Primary Examiner* — Ryan J Jakovac
(74) *Attorney, Agent, or Firm* — Rothwell, Figg, Ernst & Manbeck, p.c.

(57) ABSTRACT

A network management architecture referred to as the Control/Orchestration/Management/Policy/Analytics (COMPA) architecture (or COMPA for short). The COMPA architecture functions to simplify and automate the operations (both management and business process) of a network. In one aspect, the COMPA architecture addresses four use case categories: (1) Resource/Service Onboarding; (2) Automated Product Offerings; (3) Automated Management; and (4) Service Exposure. COMPA enables rapid service introduction into the network and lifecycle management;
(Continued)

dynamic network governance via policy; and controlled access to functionality provided by different responsibility domains.

20 Claims, 11 Drawing Sheets

(52) U.S. Cl.
CPC .......... *H04L 41/14* (2013.01); *H04L 41/0886* (2013.01); *H04L 41/147* (2013.01); *H04L 41/5051* (2013.01); *H04L 43/062* (2013.01)

(58) Field of Classification Search
CPC .. H04L 41/147; H04L 41/5051; H04L 43/062
See application file for complete search history.

(56) References Cited

U.S. PATENT DOCUMENTS

| 2014/0317261 | A1 | 10/2014 | Shatzkamer et al. |
| 2016/0057075 | A1* | 2/2016 | Parikh .................. H04L 47/762 709/226 |
| 2016/0057234 | A1 | 2/2016 | Parikh et al. |
| 2018/0316569 | A1* | 11/2018 | Cilfone .................. H04L 41/14 |

OTHER PUBLICATIONS

International Search Report and Written Opinion dated Jan. 26, 2017 in International Application No. PCT/SE2016/050474 (U.S. Appl. No. 15/108,830)), 15 pages.

* cited by examiner

AUTOMATIC NETWORK MANAGEMENT SYSTEM AND METHODS

CROSS-REFERENCE TO RELATED APPLICATION(S)

This application is a 35 U.S.C. § 371 National Phase Entry Application from PCT/SE2016/050473, filed May 23, 2016, and designating the United States.

TECHNICAL FIELD

Aspects of this disclosure relate to systems and methods for network management.

BACKGROUND

The goal of increasing the degree to which a network is managed automatically is not new. Autonomic networks have been a subject of research over the last 15 years, and technologies for achieving network automation are evolving. Recently there have been advances in a few specific technologies that increase both the urgency to increase automation as well as the possibilities of doing so. For example, Network Function Virtualization (NFV) provides flexibility in how network functionality is deployed and where it is deployed, which is enabled by the increasing maturity of cloud execution environments to support large number of diverse workloads in either a centralized or distributed manner. Additionally, Software Defined Networking (SDN) enables networking flexibility and the means to provide connectivity (networking) to the deployed virtual or physical network functions. This is often referred to as programmable networking. Furthermore, analytics technologies have evolved to the state where they can provide advanced insights into the state of the network.

SUMMARY

The increased flexibility provided by new technologies, such as SDN, has led to networks that are difficult to operate and require a high degree of manual intervention. Existing solutions to this problem tend to group together several functions to achieve a desired result. For example, existing solutions group together the means for producing insights (analytics), the means for selecting a recommended action based on insights (policy), and the means for executing the recommended actions. Some such existing solutions merely rely on a script to produce the insights, make the recommendations based on the insights, and then perform the recommended actions. Such scripts are rather inflexible and typically need to be manually modified in the event the recommended action does not produce the intended result or the inputs to the script change. Additionally, because such scripts tightly couple the implementation of the required functions it is very difficult to change one of the functions (e.g., analytics or policy) without a major impact.

Described herein is a network management architecture referred to as the Control/Orchestration/Management/Policy/Analytics (COMPA) architecture (or COMPA for short).

The COMPA architecture functions to simplify and automate the operations (both management and business process) of a network. In one aspect, the COMPA architecture addresses four use case categories: (1) Resource/Service Onboarding; (2) Automated Product Offerings; (3) Automated Management; and (4) Service Exposure. COMPA enables rapid service introduction into the network and lifecycle management; dynamic network governance via policy; and controlled access to functionality provided by different responsibility domains.

In some embodiments, these results are achieved through the following: (1) an architectural pattern for advanced automated management called the "COMPA-Loop"—the architectural pattern comes with a set of COMPA agents that can be applied at various levels in the network architecture (it is expected that these agents can be implemented with re-usable components); (2) an enterprise wide policy framework for policy definition, deployment and execution of service and resource policies; (3) architectural patterns for a higher level of automation of resource onboarding and service onboarding, based on policy-driven workflow orchestration; and (4) Analytics based on a common architecture and interfaces.

In one embodiment, the COMPA architecture includes four agents that each provide a unique set of functionality. These four agents are: (1) a Control, Orchestration and Management (COM) agent; (2) a policy agent; (3) an analytics agent; and (4) a Resource Domain Common Functions (RDCF) agent.

The COM agent may be configured to perform requested actions, such as, for example, actions requested by a policy agent and actions for supporting resource and service onboarding requests. In some embodiments, the policy agent functions to request a COM agent to perform certain actions based on, for example, insights received from an analytics agent. An analytics agent may be configured to provide insights (i.e., reports), such as insights identifying current (and/or predicted) events or conditions within the network. In some embodiments, an RDCF agent provides service exposure, maintains catalogs (e.g., a service catalog and/or a resource catalog), and maintains inventories.

In one specific aspect, a COMPA system is provided that includes a first analytics agent; a first policy agent, and a first COM agent. The first analytics agent is configured to: collect data from various data sources, process collected data into insights, and provide requested insights to a consuming agent (e.g., the first policy agent) in response to receiving from the consuming agent a report request identifying a requested insight type. The first policy agent is configured to request the first analytics agent to send to the first policy agent one or more insights. In some embodiments, the first policy agent is configured such that, in response to receiving a set of one or more insights from the first analytics agent, the first policy agent uses a policy and the one or more insights to determine whether a first action should be taken, and, as a result of determining the first action should be taken, transmits to the first COM agent a first action request message for identifying the first action, and the first COM agent is configured such that, in response to receiving the first action request message, the first COM agent performs the requested first action.

In some embodiments, the COMPA system further includes a second analytics agent and a third analytics agent. The second analytics agent is configured to: collect data from various data sources, process collected data into insights, and provide requested insights to a consuming agent in response to receiving from the consuming agent a report request identifying a requested insight type. The third analytics agent configured to: 1) request the first analytics agent to send to the third analytics agent one or more insights generated by the first analytics agent, 2) request the second analytics agent to send to the third analytics agent one or more insights generated by the second analytics agent, and 3) generate at least one insight based at least in part on one or more insights transmitted to the third analytics agent from the first analytics agent and one or more insights transmitted to the third analytics agent from the second analytics agent.

In some embodiments, the COMPA system further includes a second policy agent configured to request the third analytics agent to send to the second policy agent one or more insights generated by the third analytics agent based at least in part on one or more insights transmitted to the third analytics agent from the first analytics agent and one or more insights transmitted to the third analytics agent from the second analytics agent.

In some embodiments, the COMPA system further includes a second COM agent. In such an embodiment, the second policy agent may be configured such that, in response to receiving a set of one or more insights from the third analytics agent, the second policy agent uses a policy and the one or more insights received from the third analytics agent to determine whether a second action should be taken. And, as a result of determining the second action should be taken, the second policy agent transmits to the second COM agent a second action request message for identifying the second action. The second COM agent is configured such that, in response to receiving the second action request message, the second COM agent performs the requested second action.

In some embodiments, the COMPA system includes a plurality of responsibility domains (RDs) comprising a first RD and a second RD. In some embodiments, the first analytics agent, the first policy agent, and the first COM agent are part of the first RD but not part of the second RD, and the third analytics agent, the second policy agent, and the second COM agent are part of the second RD but not part of the first RD. The plurality of RDs may further include a third RD and the second analytics agent may be a part of the third RD but not a part of the first or second RD.

In some embodiments, the first policy agent is configured to request the first analytics agent to send to the first policy agent one or more insights by transmitting to the first analytics agent a report request message. In some embodiments, the report request message includes: a report type identifier identifying a requested report type; and time interval information specifying the periodicity with which the first analytics agent should send to the first policy agent a report of the requested report type. The report request message may further include an object identifier specifying a target object. The target object may be one of: an identified subscriber, an identified group of subscribers, an identified service, and an identified network element.

In some embodiments, the first analytics agent is configured to transmit to the first policy agent a real-time insight in response to detecting that a load on a service has met or exceeded a threshold. In such an embodiment, the first policy agent can be configured such that, after receiving the real-time insight, the first policy agent determines whether more resources should be added to the service. Additionally, the first policy agent can be configured such that, in response to determining that more resources should be added to the service, the first policy agent transmits to the first COM agent a message requesting that the first COM agent add more resources to the service.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments.

DETAILED DESCRIPTION

Figure 1:
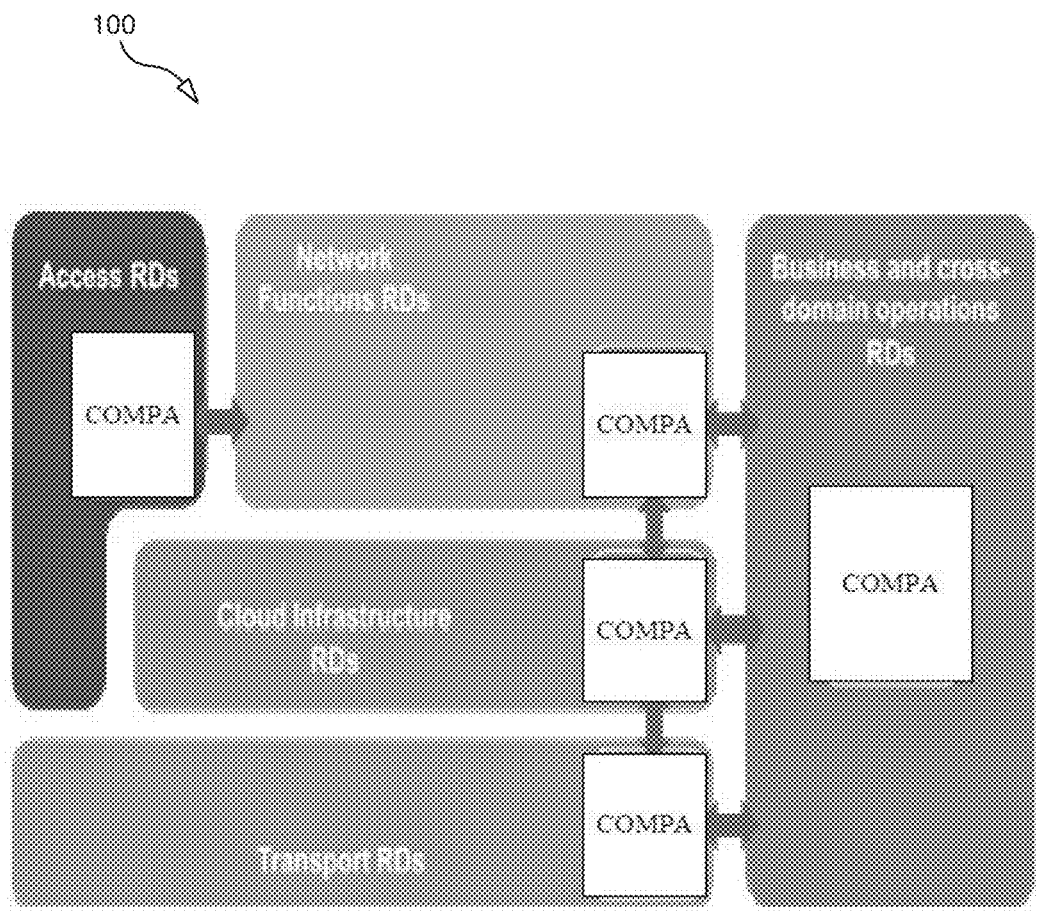
FIG. 1 illustrates a high level resource domain (RD) architecture according to some embodiments.

FIG. 1 illustrates a high level network architecture diagram of an example network 100 according to some embodiments. As illustrated in FIG. 1, the network 100 may be segregated into a number of Responsibility Domains (RD) as a way to provide separation of concerns. An RD corresponds to a set of functions under the responsibility of an specific organization within a network operator's business structure. The division of functions for a given RD is subject to the network operator's internal organizational structure and may change from network operator to network operator. Each RD will typically contain all the necessary functionality for the related organization to execute on its responsibility, and the functionality may be shared/replicated with other RDs. Each RD has the capability to expose services that can be consumed by others; and in itself consumes services provided by other RDs, as explained herein.

As further shown in FIG. 1, the example network 100 is divided into five RDs: an Access RD, a Network Functions RD, a Cloud Infrastructure RD, a Transports RD, and Business and cross-domain operations RD. As further shown, each RD may implement its own COMPA system.

Figure 2:
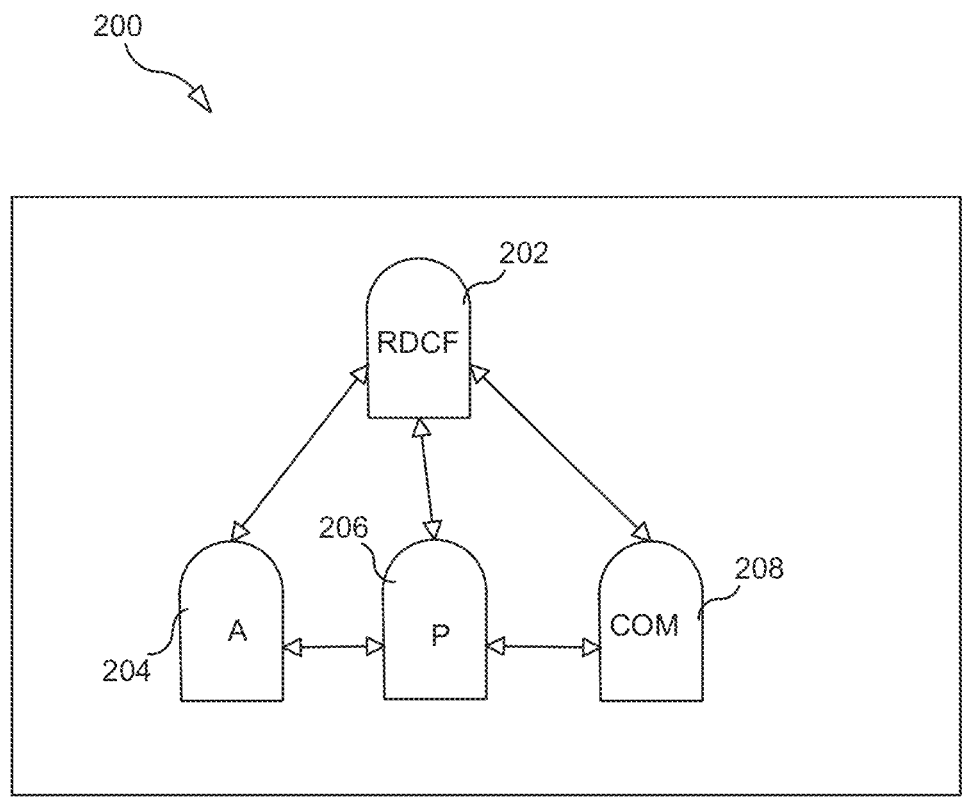
FIG. 2 illustrates components of a COMPA system according to some embodiments.

FIG. 2 illustrates an exemplary COMPA system 200, which can be implemented in any one or more of the RDs shown in FIG. 1 or other RDs not illustrated. As shown in FIG. 2, the exemplary COMPA system 200 includes the following agents: an analytics agent 204, a policy agent 206, a COM agent 208 and an RDCF agent 202. Other COMPA system may consist of subsets of these agents and/or may include additional agents.

In some embodiments, COM agent 208 is configured to perform requested actions, such as, for example, actions requested by a policy agent and actions for supporting resource and service onboarding requests. Thus, in some embodiments, COM agent 208 is configured to receive action request messages that request COM agent 208 to perform actions, such as, for example, onboarding of resources and/or services.

In some embodiments, a resource can be any one of: a network function (e.g., Mobility Management Entity, Serving Gateway, etc.), switching/routing equipment, computing resources, storage resources, a COMPA agent.

In some embodiments, policy agent 206 functions to request a COM agent, such as COM agent 208, to perform certain actions based on, for example, a policy decision that policy agent makes based on, for example, insights received from an analytics agent, such as analytics agent 202 or an analytics agent in another COMPA system in another RD. Accordingly, policy agent may be configured to transmit insight request messages to an analytics agent and transmit action request messages to a COM agent. Additionally, policy agent 206 may be configured to receive from a COMPA system agent (e.g., a COM agent) or a non-COMPA system policy event messages that contain information for use by policy agent in making the policy decision.

In some embodiments, Analytics 204 agent is configured to provide insights (i.e., reports), such as insights identifying current (and/or predicted) events or conditions within the network. For example, in some embodiments, analytics agent 204 is configured such that, in response to receiving a historical insight request message, analytics agent 204 periodically transmits an historical insight to the requesting entity, which is typically a policy agent, and is further configured such that, in response to receiving a real-time insight request message, analytics agent 204 immediately transmits an insight to the requesting entity.

In some embodiments, RDCF agent 202 provides service exposure, maintains catalogs (e.g., a service catalog and/or a resource catalog), and maintains inventories.

Analytics Agent 204 Messages

As explained above, analytics agent 204, in some embodiments, is configured to act on certain defined messages. In some embodiments, these messages include the following messages: 1) the historical insight request message; 2) the real-time insight request message; 3) an historical insight tuning message; and 4) an historical insight termination message. The below tables (Tables 1-4) illustrate the information elements that may be included in each of the messages:

TABLE 1 historical insight request message

| Information Element | Description |
|---|---|
| Version | Specifies the version of the operation (RD name may be added) |
| Periodicity | Specifies the time interval for reporting, i.e., how often reports should be generated (e.g., at a certain time of day or as soon as an insight repot is available). |
| Report Type | Continuous reporting or specific report (requested with ID). A request for a specific report overrides periodicity. |
| Delivery Type | The requested type of delivery of the insight report: e.g., guaranteed delivery ("Class1"), non-guaranteed delivery ("Class4"), Error-detection delivery ("Class2") |
| Insight Object | Specifies the target for the analytics, e.g. per subscriber, group of subscribers, network element, etc. |
| Requested Insight Type | The requested type of analytics chosen from the list of supported insight types e.g., the insights available e.g., for security-analytics, roaming-analytics, transport network analytics, churn analytics |
| Request Insight Type Qualifier | This parameter is a container and allows a consumer to specify options available for a Requested Insight Type. Examples are: "Insight Quality Selection" (High, Medium, Low), "Insight Type Option Selection" (e.g., roaming analytics with or without usage data). The available options are obtained with the service Capability discovery procedure. |

TABLE 2 real-time insight request message

| Information Element | Description |
|---|---|
| Version | Specifies the version of the operation (RD name may be added). |
| Delivery Type | The requested type of delivery of the insight report: e.g., guaranteed delivery ("Class1"), non-guaranteed delivery ("Class4"), Error-detection delivery ("Class2") |
| Insight Object | Specifies the target for the analytics, e.g., per subscribers, a group of subscribers, network element, etc. |
| Requested Insight Type | The requested type of analytics chosen from the list of supported insight types e.g., the insights available e.g., for security-analytics, roaming-analytics, transport network analytics, churn analytics |
| Requested Insight Type Qualifier | This parameter is a container and allows a consumer to specify options available for a Requested Insight Type. Examples are: "Insight Quality Selection" (High, Medium, Low), "Insight Type Option Selection" (e.g., roaming analytics with or without usage data). The available options are obtained with the Service Capability discovery procedure. |

TABLE 3 historical insight tuning message

| Information Element | Description |
|---|---|
| Version | Specifies the version of the operation (RD name may be added). |
| Delivery ID | Handle identifying the Analytics Insight Delivery instance. |
| Tune Historical | A container for parameters specifying the historical insight delivery also used in the "Request Historical Analytics Insight Delivery" operation; e.g., Periodicity, Report Type, Delivery Type, Insight Object, Requested Insight Type and Requested Insight Type Qualifier. See Request Historical Analytics Insight Delivery for further information. |
| Tune Real-Time | A container for parameters specifying the real-time insight delivery also used in the "Request Real-Time Analytics Insight Delivery" operation: e.g., Delivery Type, Insight Object, Requested Insight Type Requested and Insight Type Qualifier. See Request Real-Time Analytics Insight Delivery for further information. This parameter is used to add historic analytics (trend insights) as input to the real-time analytics job. |

TABLE 4 historical insight termination message

| Information Element | Description |
|---|---|
| Version | Specifies the version of the operation |
| Delivery ID | Handle identifying the Analytics Insight Delivery Instance. |

With respect to the historical insight request message, as a result of receiving this message, analytics agent 204 creates in a database a record storing information contained in the received message (e.g., the periodicity, report type, etc.) and transmits to the entity that transmitted the request an acknowledgement message containing a delivery identifier for use in later retrieving the database record from the database. Also, as a result of receiving the historical insight request message, analytics agent 204 will, based on the periodicity defined in the request, periodically transmit an historical insight delivery message comprising an insight. The transmitted historical insight delivery message may further include the identifier that was included in the acknowledgement message. The insight included in the historical insight delivery message may be formatted using a markup language (e.g., Extensible Markup Language (XML)) or using JavaScript Object Notation (JSON)) or otherwise formatted.

With respect to the historical insight tuning message, as a result of receiving this message, analytics agent uses the delivery identifier included in the tuning message to update the database record based on the parameters included in the tuning message (e.g., the periodicity parameter).

With respect to the historical insight termination message, as a result of receiving this message, analytics agent uses the delivery identifier included in the tuning message to delete the database record or update the database record to indicate that no further historical insights defined by the record should be sent.

With respect to the real-time insight request message, as a result of receiving this message, analytics agent 204 generates a real-time insight and transmits a real-time insight delivery message comprising the generated real-time insight. In some embodiments, after the insight request message is received and before the delivery message is sent, analytics agent 204 transmits an acknowledgement message with a delivery identifier, and the delivery message includes the delivery identifier. The insight report may be formatted using XML or JSON and contains information (e.g., real-time information) requested in the real-time insight request message.

Policy Agent 206

Policy agent 206, in some embodiments, is configured to act on certain defined messages. In some embodiments, these messages include: 1) a policy data message; and 2) request policy decision message. The below tables (Tables 5 and 6) illustrate the information elements that may be included in each of the messages:

TABLE 5

Policy Data Message

| Information Element | Description |
|---|---|
| Version | Specifies the version number of the message |
| Event Report (required) | Information that the policy agent may use in making a policy decision |
| Context | Additional information that the policy agent may use in making a policy decision |

TABLE 6

Request Policy Decision Message

| Information Element | Description |
|---|---|
| Version | Specifies the version number of the message |
| Policy Decision Input | Parameters required for execution of a policy statement (e.g., rule) by the policy agent. These parameters may include a rule identifier to identify a rule that the policy agent should evaluate |
| Context | Additional information that the policy agent may use in making a policy decision |

With respect to the policy data message, this message can be transmitted to the policy agent by any resource in the network. As a result of receiving this message, policy agent 206 may store the event report (or stores at least some of the information included in the event report) so that the information can be used at a later time as input to a policy statement executed by policy agent 206, or policy agent may execute a policy statement based on the event report immediately after receiving the policy data message. As one example, a resource (e.g., a security system which may or may not follow COMPA principles) sends a policy data message to the policy agent with an event report containing information informing the policy agent about a detected denial of service attack, and the policy agent acts on this information immediately by, for example, determining based on a policy statement a set of or more actions that should occur.

With respect to the request policy decision message, as a result of receiving this message, policy agent 206 uses the information contained in the Policy Decision Input IE (and possibly previously stored event report information) to execute a policy statement, and thereby make a policy decision. An identifier identifying the policy statement may be included in the Policy Decision Input IE together with parameters required by the policy statement. In some embodiments, the result of the policy decision is returned to the entity that transmitted the request policy decision message.

In some embodiments, as a result of executing a policy statement, the policy agent may be triggered to send to a COM agent a Request Action message.

COM Agent 208

COM agent 208, in some embodiments, is configured to act on certain defined messages. In some embodiments, these messages include the message identified in TABLE 7.

TABLE 7

Messages COM Agent is configured to Act On

| Message Name | COM agent Response |
|---|---|
| Request Action | performs action identified in the request using action parameters, if any, included in the request. COM agent, after performing the action, may transmit to the entity sending the request (usually a policy agent), a requested action outcome report specifying the result of the action (e.g., Success or failure) and an action ID for identifying the action |
| Deploy Resource Specification | deploys the descriptions of the resource and the resource SW. |
| Delete Resource Specification | deletes the descriptions of the resource and the resource SW. |
| Deploy Service Specification | deploys the descriptions of the service. |
| Update Service Specification | updates the descriptions of an already deployed service. |
| Delete Service Specification | deletes the descriptions of the service. |
| Instantiate Resource | instantiates a resource, or change an already instantiated resource (e.g. deploy/activate the resource SW) |
| Release Resource Instance | releases a resource instance i.e. reducing the capacity of the resource type. The request also includes how the potential used sub-resources should be handled. |
| Instantiate Service | instantiates a service based on a deployed service i.e. descriptions are already available including the descriptions of the resources needed for the services type, hence applicable resource instantiation will happen. Or request to change an already instantiated service. |
| Release Service Instance | releases a service instance i.e. reducing the capacity of the service type. The request also includes how the used resources should be handled. |

Tables 8 to 17 below illustrate an exemplary embodiment of the COM agent messages shown in table 7.

TABLE 8

Request Action Message

| Information Element | Description |
|---|---|
| Version | Specifies the version of the operation (RD name may be added) |
| Action | Specifies the action that the COM agent is being asked to perform. |
| Action parameters | Additional parameters, depending on action. |

TABLE 9

Deploy Resource Specification Message

| Information Element | Description |
|---|---|
| Version | Specifies the version of the operation (RD name may be added) |
| Resource Descriptor | Contains all aspects of the resource e.g. the description of and the requirements of the resource. This should either be the object or the reference to where the object can be found. |
| Resource SW | The software package (SW), if any, for implementing the resource or a pointer to the SW. The SW contains executable software (e.g., scripts, executable binary code (e.g., OVF image), etc.) |

TABLE 10

Delete Resource Specification Message

| Information Element | Description |
|---|---|
| Version | Specifies the version of the operation (RD name may be added) |

TABLE 10-continued

Delete Resource Specification Message

| Information Element | Description |
|---|---|
| Resource Specification ID | The identity of the resource specification to be deleted. |

TABLE 11

Deploy Service Specification Message

| Information Element | Description |
|---|---|
| Version | Specifies the version of the operation (RD name may be added) |
| Service Descriptor | Contains all aspects of the service e.g. the description of and the requirements of the service e.g. needed resources. This should either be the object or the reference to where the object can be found. |

TABLE 12

Update Service Specification Message

| Information Element | Description |
|---|---|
| Version | Specifies the version of the operation (RD name may be added) |

TABLE 12-continued

Update Service Specification Message

| Information Element | Description |
|---|---|
| Service Specification ID | The identity of the service specification to be updated. |
| Service Descriptor | Contains all aspects of the service e.g. the description of and the requirements of the service e.g. needed resources. This should either be the object or the reference to where the object can be found. |
| Instantiated Services handling | Defines if the already instantiated services based on this Service Specification ID should be updated based on this service update |

TABLE 13

Delete Service Specification Message

| Information Element | Description |
|---|---|
| Version | Specifies the version of the operation (RD name may be added) |
| Service Specification ID | The identity of the service specification to be delete. |

TABLE 14

Instantiate Resource Message

| Information Element | Description |
|---|---|
| Version | Specifies the version of the operation (RD name may be added) |
| Identity | Identity of the resource specification to be instantiated, or the instantiated resource to be changed identified with Resource Specification ID and Resource Instance ID, respectively |
| Context | Contains the context in which a resource specification should be instantiated e.g. capacity, affinity, configuration including how, when and by who the instantiated resource can be used, or the changed context of an already instantiated resource. |

TABLE 15

Release Resource Instance Message

| Information Element | Description |
|---|---|
| Version | Specifies the version of the operation (RD name may be added) |
| Resource Instance ID | The identity of the instantiated resource to be released. |
| Sub resource management | Specifies how possible resources used by this instantiated resource should be handle e.g. released or kept. |

TABLE 16

Instantiate Service Message

| Information Element | Description |
|---|---|
| Version | Specifies the version of the operation (RD name may be added) |
| Identity | Identity of the service specification to be instantiated, or the instantiated resource to be changed identified with Service Specification ID and Service Instance ID, respectively. |
| Service Parameters | parameters to tailor the service, these could be service level parameters such as addressing information, or it could be parameters that influence the characteristics of the service. |
| Context | Contains the context in which a service specification should be instantiated e.g. capacity, affinity, configuration including how, when and by who the instantiated resource can be used, or the changed context of an already instantiated service. |

TABLE 17

Release Service Message

| Information Element | Description |
|---|---|
| Version | Specifies the version of the operation (RD name may be added) |
| Service Instance ID | The identity of the instantiated service to be released. |
| Resource management | Specifies how the resources used by this instantiated service should be handle e.g. released or kept. |

RDCF Agent 202

RDCF agent 202, in some embodiments, is configured to act on certain defined messages. In some embodiments, these messages include the message identified in table 18 below.

TABLE 18

| Message | RDCF agent response |
|---|---|
| C_Service Capability Registration | Registers both specification and instances of services/resources supplied by the invoker (e.g., A, P, and COM) |
| C_Service Capability Discovery | Searches for a matching Service Capability and if found transmits a C_Service Capability Discovery Response |
| C_Service Capability Delete | Removes a Service Capability identified in the message |
| C_Service Capability Update | Updates both specification and instances of the identified service capability |
| Service Specification Registration | Stores a service specification containing the service description included in the message |
| Service Specification Discovery | Searches for requested service specification and if found returns a reference to the matching registered service specifications URI. |

TABLE 18-continued

| Message | RDCF agent response |
|---|---|
| Service Specification Delete | Removes the identified service specification |
| Service Specification Update | Updates the identified service specification |
| Services Instance Registration | Registers the identified service instance (e.g., stores information included in the message in a service instance registration record). |
| Service Instance Discovery | Searches for an instance of the specified service type and if found return an identifier for the instance (e.g., a reference to the matching registered services, URI). |
| Service Instance Delete | Removes the identified service instance |
| Service Instance Update | Updates the identified service instance (e.g., updates the a service instance registration record for the service) |
| Resource Specification Registration | Stores a resource specification containing the resource description included in the message |
| Resource Specification Discovery | Searches for requested resource specification and if found return a resource specification id. |
| Resource Specification Delete | Removes the identified resource specification |
| Resource Specification Update | Updates the identified resource specification |
| Resource Instance Registration | Registers the identified service instance (e.g., stores information included in the message in a resource instance registration record). |
| Resource Instance Discovery | Searches for an instance of the specified resource type and if found return an identifier for the instance |
| Resource Instance Delete | Removes the identified resource instance |
| Resource Instance Update | Updates the identified resource instance (e.g., updates the a resource instance registration record for the resource) |
| Authentication Validation | Validates the credentials included in the message |
| Authorization Validation | Verifies that an authenticated entity consumer has the correct permissions and rights to access the requested operation |

Tables 19-40 illustrate the information elements that may be included in each of the messages show in TABLE 18.

TABLE 19

C_Service Capability Registration

| Information Element | Descriptions |
|---|---|
| Version | Specifies the version of the operation |
| C_Service Capability ID | Specifies the COMPA capability to be registered (e.g., a Policy capability or an Analytics capability). |
| Address | Address for the service (e.g., IP address, server name, URL, URI, URN). This address is used by a consumer when requests a service e.g.-"Request Historical Analytics Insight Delivery". |
| Service Description | Identifies the type of service capability that is registered with a description of the service, e.g., Service Operations, Service Parameters, Service Meta data etc. Each of the interfaces has an address (URN) for downloading interface specifications and a procedural description in text. |

TABLE 20

C_Services Capability Discovery

| Information Element | Description |
|---|---|
| Version | Specifies the version of the operation |
| Requested Service | Request to obtain COMPA service description for all registered services, or for a specific type of service such as Analytics, Policy or COM |

TABLE 21

C_Service Capability Delete

| Information Element | Description |
|---|---|
| Version | Specifies the version of the operation. |
| C_Service Capabilities | Specifies the key of COMPA capability to be Deleted. |

TABLE 22

C_Service Capability Update Operation

| Information Element | Description |
|---|---|
| Version | Specifies the version of the operation. |
| C_Service Capabilities | Specifies the key of COMPA capability to change state. |
| Service Description | Identifies the attributes of service capability to be updated that is registered with description of the service, e.g., Service Operations, Services Parameters, Service Meta data etc. Each of the interfaces has an address (URN) for downloading interface specification and a procedural description in text. |

TABLE 23

Service Specification Registration

| Information Element | Description |
|---|---|
| Version | Specifies the version of the operation |
| Service Specification ID | Specifies the type of network service to be registered |

TABLE 23-continued

Service Specification Registration

| Information Element | Description |
| --- | --- |
| Service Description | Identifies the types of network service that is registered with a description of the service. Describes the type, operations, and parameters. These services are exposed over the native interfaces. |
| State | Defines the state in the lifecycle, e.g. Testing, Staging, Operational, Phase out, Retired. |

TABLE 24

Service Specification Discovery

| Information Element | Description |
| --- | --- |
| Version | Specifies the version of the operation |
| Service Specification ID | Specifies the ID of network service to be discovered |
| Services Description | Describes the type of service to search for e.g., Describes service type, operations and parameters that matches. |
| State | Defines the state in the lifecycle, e.g., Testing, Staging, Operational, Phase out, Retired to be matched |

TABLE 25

Service Specification Delete

| Information Element | Description |
| --- | --- |
| Version | Specifies the version of the operation |
| Service Specification ID | Specifies the type of network services to be Deleted |

TABLE 26

Service Specification Update

| Information Element | Description |
| --- | --- |
| Version | Specifies the version of the operation |
| Service Specification ID | Specifies the type of network service |
| Service Description | Identifies the parameters of the specification to be updated and their new values. Describes service type, operations and parameters. These services are exposed over the native interface. |
| State | Defines the new state in the lifecycle, e.g. Testing, Staging, Operational, Phase out, Retired. |

TABLE 27

Service Instance Registration

| Information Element | Description |
| --- | --- |
| Version | Specifies the version of the operation |
| Service Specification ID | Specifies the type (specification) of the instance of the service to be registered. The specification must exist prior to registering the instance of it. |
| Service Instance ID | Specifies the instance ID of service to be registered. |

TABLE 27-continued

Service Instance Registration

| Information Element | Description |
| --- | --- |
| Address | URI for the service (This is in line with SOA architecture and corresponds to the address of service access point, targeting the service itself or a load balancer in front of the service itself. It does not directly correspond to the TMP SID information model where the service is "virtual"(independent of the implementation in a resource) and the actual "service access point" is found in the resource layer, linked by the resource facing service as a part of the service.) |
| State | Defines the state in the lifecycle, e.g., Testing, Staging, Operational, Phase out, Retired. |

TABLE 28

Service Instance Discovery

| Information Element | Description |
| --- | --- |
| Version | Specifies the version of the operation |
| Service Specification ID | Specifies the type of service to be searched for. |
| State | Defines the state in the lifecycle, e.g., Testing, Staging, Operational, Phase out, Retired. |

TABLE 29

Service Instance Delete

| Information Element | Description |
| --- | --- |
| Version | Specifies the version of the operation |
| Service Specification ID | Specifies the type of service instance to be Deleted. |

TABLE 30

Service Instance Update

| Information Element | Description |
| --- | --- |
| Version | Specifies the version of the operation |
| Service Specification ID | Specifies the type of service instance to be updated. |
| Service Instance ID | Identifies the Service Instance to be updated. |
| Service Instance | identifies the parameters of the instance entity to be updated in their new values. |
| State | Defines the new state in the lifecycle, e.g., Testing, Staging, Operational, Phase out, Retired. |

TABLE 31

Resource Specification Registration

| Information Element | Description |
| --- | --- |
| Version | Specifies the version of the operation |
| Resource Specification ID | Specifies the type of network Resource to be registered |
| Resource Descriptor | Contains all aspects of the resource e.g. the description of and the requirements of the resource. This should either be the object or the reference to where the object can be found. |

TABLE 31-continued

Resource Specification Registration

| Information Element | Description |
|---|---|
| Resource SW | The software package (SW), if any, for implementing the resource or a pointer to the SW. The SW contains executable software (e.g., scripts, executable binary code (e.g., OVF image), etc.) |
| State | Defines the state in the lifecycle, e.g., Testing, Staging, Operational, Phase out, Retired. |

TABLE 32

Resource Specification Discovery

| Information Element | Description |
|---|---|
| Version | Specifies the version of the operation |
| Resource Specification ID | Specifies the type of network Resource to be discovered |
| Resource Description | Describes the type of Resource to search for, e.g., Resource Type, operations and parameters. |
| State | Defines the state in the lifecycle, e.g., Testing, Staging, Operational, Phase out, Retired. |

TABLE 33

Resource specification Delete

| Information Element | Description |
|---|---|
| Version | Specifies the version of the operation |
| Resource Specification ID | Specifies the type of network Resource to be Deleted |

TABLE 34

Resource Specification Update

| Information Element | Description |
|---|---|
| Version | Specifies the version of the operation |
| Resource Specification ID | Specifies the type of network Resource |
| Resource Specification | Identifies the parameters of the specification to be updated and their new values. Describes service type, operations and parameters. These services are exposed over the native interfaces. |
| State | Defines the new state in the lifecycle, e.g., Testing, Staging, Operational, Phase out, Retired. |

TABLE 35

Recourse Instance Registration

| Information Element | Description |
|---|---|
| Version | Specifies the version of the operation |
| Resource Specification ID | Specifies the type (specification) of the instance of the resource to be registered. The specification must exist prior to registering the instance of it. |
| Resource Instance ID | Specifies the instance ID of Resource to be registered. |

TABLE 35-continued

Recourse Instance Registration

| Information Element | Description |
|---|---|
| Address | URI for the resource |
| State | Defines the state in the lifecycle, e.g., Testing, Staging, Operational, Phase out, Retired. |

TABLE 36

Resource Instance Discovery

| Information Element | Description |
|---|---|
| Version | Specifies the version of the operation |
| Resource Specification ID | Specifies the type of resource instance to be searched for. |
| State | Defines the state in the lifecycle, e.g., Testing, Staging, Operational, Phase out, Retired. |

TABLE 37

Resource Instance Delete

| Information Element | Description |
|---|---|
| Version | Specifies the version of the operation |
| Resource Specification ID | Specifies the type of resource instance to be Deleted. |

TABLE 38

Resource Instance Update

| Information Element | Description |
|---|---|
| Version | Specifies the version of the operation |
| Resource Specification ID | Specifies the type of resource instance to be updated. |
| Resource Instance ID | Specifies the type of resource instance to be updated. |
| Resource Instance | Identifies the parameters of the instance to be updated and their new values. |
| State | Defines the new state in the lifecycle, e.g., Testing, Staging, Operational, Phase out, Retired. |

TABLE 39

Authentication Validation

| Information Element | Description |
|---|---|
| Credentials | A consumer must have a valid consumer account configured by the administrator of the SAC database that specifies the consumer's permissions and rights. Consumer credentials must be associated with this account. Credentials may include user name + password, certificates, tokens, etc. |
| Session ID | Session ID |
| Time (optional) | This time validation against the timestamp that the SAC has stored for this user and session |

TABLE 40

Authorization Validation

| Information Element | Description |
| --- | --- |
| Authenticated Consumer Identity | The consumer identity is related to the consumer credentials and are validated in the SAC. |
| Server ID | Server ID |
| Operation | This could be any of the operations provided by the COMPA interfaces C1-C4 |

Table 41 below illustrates an exemplary embodiment of the C_Service Capability Discover Response.

TABLE 41

C_Service Capability Discover Response

| Information Element | Decscription |
| --- | --- |
| C_Service Capability ID | Specifies the ID of capability to be discovered. In COMPA we have Analytic, Policy and COM but other capabilities may also use the same capability registration. |
| Address | URN for a service. This address is used by consumers of discovered services when these invoke a service, e.g.,- "Request Historical Analytics Insight Delivery" |
| Services Description | Identifies the type of service capability that is registered with a description of the service, e.g. Service Operations, Service Parameters, Service Meta data etc. Each of the interfaces has an address (URN) for downloading interface specifications and a procedural description in text. Here the Service Description is used for finding matching entities. |

Use Case Categories

There are numerous possible uses cases for the COMPA system. In some embodiments, each use case can be categorized into one of the following four categories: Resource/Service Onboarding; Automated Product Offering (APO); Automated Management (AM); and Service Exposure (SE).

Resource/Service Onboarding:

In some embodiments, before a product (i.e., service) can be offered automatically using COMPA, the service and the resources required by the service must first be onboarded, which means that the specification for the service and the specification for each resource required by the service must be registered with an RDCF agent. This is referred to as Resource/Service Onboarding. Additionally, the resources required to instantiate the service must be instantiated (i.e., made operational) in response to a request to instantiate the service or must have been previously instantiated. That is, some resources will be instantiated when the service is instantiated (e.g. setting up a new network for a special type of service, how to setup the resources is not known before the service request is received), while other Resources that were instantiated before the request to instantiate the service is received may require a re-configuration for the service when the service is instantiated. Some resources will be also instantiated during operation to add more resources to cover an increase in load.

Resource/Service Onboarding includes: the deployment of service and resource specifications and the deployment of some resource instances. A service specification describes the services offered by the service and the elements (e.g., resources) that are needed in order for the service to provide the services the service offers. Accordingly, in some embodiments, service specifications identify (e.g., contain links to) resource specifications. Accordingly, in some embodiments, before a particular service specification is deployed, the resource specification identified by the particular service specification should be deployed first, if they are described as required to be instantiated in order to later instantiate the service. During instantiation of resource instances the applicable resource specifications are used. The resource instances describe what has been instantiated, the description includes which service or resource instance it supports and which resource instances it uses. Instantiation of a service is part of Automatic Product Offerings (APO), which is described in the next section, and may imply the instantiation of more resources.

First Example Use Case—Deploy Service Specification

Figure 3:
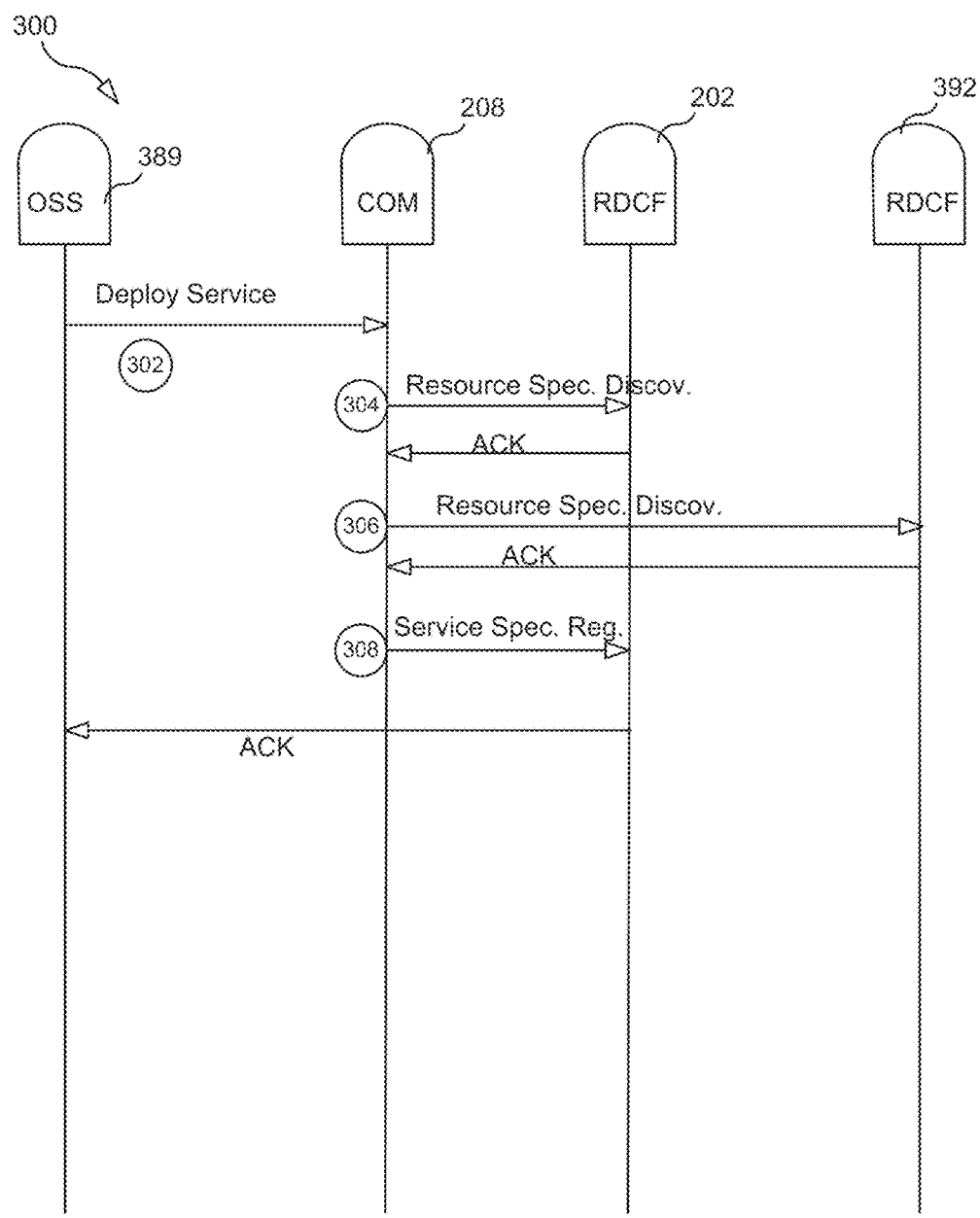
FIGS. 3-7 are message flow diagrams illustrating various processes according to some embodiments.

FIG. 3 is a message flow diagram illustrating a process 300 for deploying a service specification according to some embodiments. In the example shown, process 300 beings with step 302, wherein COM agent 208 receives a Deploy Service Specification (DSS) message transmitted by a management system 389 (e.g., an Operations Support System). As used herein the term "transmits" covers not only sending a message via a network but also covers sending the message using interprocess communication in the case of, for example, the sender (e.g., OSS or a COMPA agent) and the receiver (e.g., a COMPA agent) running on the same processing unit, as well as sending the message using a procedure call in the case of, for example, the sender and receiver being different modules of a single process. The DSS message includes a service specification that includes a service descriptor for a service. In this example, the service descriptor includes a set of two or more resource specification identifiers including a first and a second resource specification identifier (in other example the set of resource specification identifiers may consist of a single resource specification identifier). Each resource specification identifier included in the set of resource specification identifiers identifies a particular resource specification. In this example, the first resource specification identifier identifies a first resource specification that is maintained by a first RDCF 202, and the second resource specification identifier identifies a second resource specification that is maintained by a second RDCF 392.

The service descriptor may also include information describing the relationships, if any, between the identified resource specifications. For example, the first resource specification identifier may identify a specification for a first type of network node (e.g., Serving Gateway (SGW)) and the second resource specification identifier may identifier a specification for a second type of network node (e.g., a Mobility Management Entity (MME)). In such a scenario, the service descriptor may include information indicating that SGW must be allocated in IP address and the MME must be configured with configuration information that identifies the IP address assigned to the SGW so that when the MME and SGW are instantiated the MME will be able to communicate with the SGW over an IP network.

The COM agent 208 is configured such that, in response to receiving the DSS message, COM agent 208 determines, for each resource specification identifier included in the set, whether the resource specification identified by the resource specification identifier is maintained by at least one RDCF agent. Accordingly in step 304, COM agent 208 transmits to RDCF agent 202 a first Resource Specification Discovery (RSD) message containing the first resource specification identifier, and in step 306 COM agent 208 transmits to RDCF agent 392 a second RSD message containing the second resource specification identifier. Assuming the identified resource specifications have been previously registered with RDCF agents 202, 392, respectively, then the RDCF agents 202, 392 will respond to the respective RSD with a respective positive acknowledgement (e.g., a message comprising a pointer to the identified resource specification or comprising the resource specification itself).

COM agent 208 is further configured that, once COM agent 208 determines that each resource specification identifier included in the set identifies a resource specification that is maintained by at least one RDCF agent, COM agent 208 registers the service specification included in the DSS received from OSS 389. That is, in step 308, COM agent 208 transmits to RDCF 202 a Service Specification Registration (SSR) message comprising the service specification obtained from OSS 208.

Second Example Use Case—Instantiate a Resource

Figure 4:
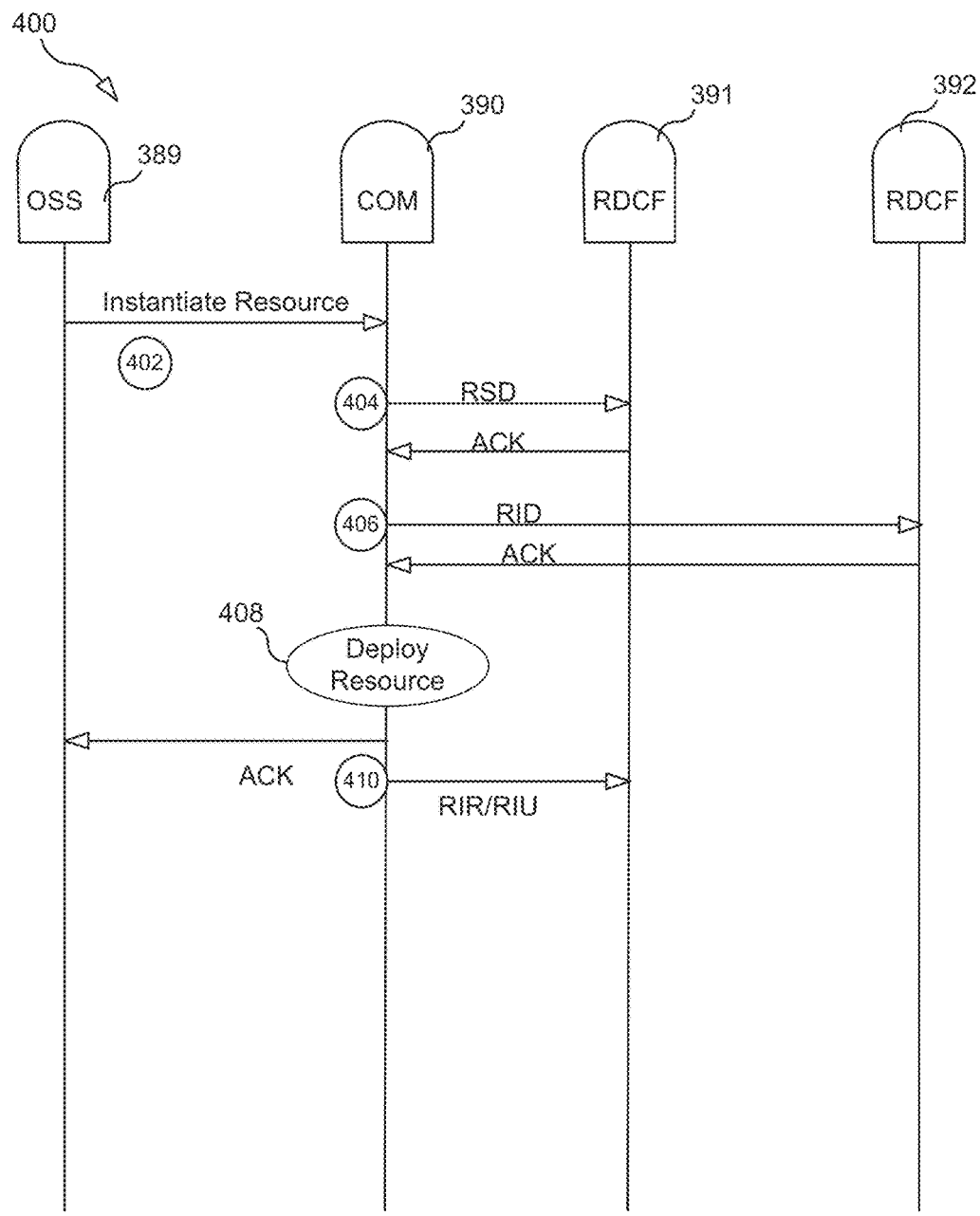

FIG. 4 is a message flow diagram illustrating a process 400 for instantiating a resource. In the example shown, process 400 beings with step 402, wherein COM agent 208 receives an Instantiate Resource (IR) message transmitted by OSS 389. The IR message includes a resource specification identifier that identifies a particular resource specification. In step 404, in response to receiving the IR message, COM agent 208 transmits to RDCF 202 a Resource Specification Discover (RSD) message that comprises the resource specification identifier included in the IR message. Assuming the identified resource specification has been previously registered with RDCF agent 202, then the RDCF agent 202 will respond to the RSD message by transmitting to COM agent 208 a message comprising a pointer to the identified resource specification or comprising the resource specification itself and COM agent will performs step 408 (and optionally 406).

After receiving the message, COM agent 208 obtains the resource specification (extracts it from the message or uses the pointer to download it) and then parses the specification to determine information about the resource specified by the resource specification. For example, the specification may indicate that the resource should be implemented as a tenant of a multi-tenant software application. Assuming that the specification indicates that the resource should be implemented as a tenant of a multi-tenant software application, COM agent 208, in step 406, sends to an RDCF agent (in this case RDCF agent 392) a Resource Instance Discovery (RID) message to determine whether an instance of the multi-tenant software application is operational.

In step 408, COM agent deploys the resource so that the resource will be operational. For example, in the case the resource is a tenant of a multi-tenant application, then in step 408 COM agent communicates with a controller of the multi-tenant application to instantiate a new tenant corresponding to the resource. This may include COM agent 208 transmitting one or more specific configuration files corresponding to the resource. As another example, in the case that the resource is a stand-alone application, then in step 408 COM agent 208 transmits to a platform for executing the resource information contained in the Resource SW information element of the resource specification corresponding to the resource (e.g., a binary executable file and/or configuration files).

After deploying a resource, COM agent 208 may transmit to RDCF 392 a Resource Instance Registration (RIR) message or a Resource Instance Update (RIU) message (step 410). RIR/RIU message may contain information about the deployed resource. This information about the deployed resource may contain, among other things, a service identifier identifying a service that the resource is supporting. As described above, RDCF 392, in response to an RIR message creates a resource instance registration records that includes information included in the RIR, including the service identifier. Similarly, RDCF 392, in response to an RIU message, updates the resource instance registration record to include information included in the RIU, including the service identifier. In this way, if a resource supports one or more services, the resource instance registration record for the resource will identify each of the one or more services. This information linking a resource to each service that the resource supports can be used by an analytics agent and/or a policy agent.

For example, an analytics agent (e.g., agent 202) may receive from an OSS a command to monitor a particular resource. In response, the analytics agent may send to the RDCF agent that maintains the resource instance registration record for the particular resource a request to provide the analytics agent with the information stored in the registration record (or a sub-set of the information, such as the list of services that the resource supports). By having knowledge of the services that the particular resource supports, the analytics agent can provide useful service information to a policy agent. For instance, if the analytics agent determines that the particular resource has become, or is on the threshold of becoming, overloaded, then the analytics agent can use the information obtained from the RDCF agent to determine the services that may be impacted by this event (i.e., the services that the particular resource supports) and then inform a policy agent not only that the particular resource is having a problem, but also can inform the policy agent that one or more identified services (i.e., the services supported by the resource) may be at risk of a performance degradation.

Similarly, a policy agent that receives from an analytics agent (or other entity) a report indicating that a particular resource is having a problem (e.g., an overload problem), the policy agent itself may send to the RDCF agent that maintains the resource instance registration record for the particular resource a request to provide the policy agent with the information stored in the registration record (or a sub-set of the information, such as the list of services that the resource supports). By having knowledge of the services that the particular resource supports, the policy agent can take an appropriate action for each service, such as, for each impacted service, instruct a COM agent to instantiate an appropriate resource for the service.

Automated Product Offering (APO):

APO is about automating the procedures required to instantiate a service into the network for a specific offering for specific (set of) users (this ranges from a service for an enterprise or services for a end-users). APO includes the instantiation of a service and instantiation/allocation of resources required for this service. The instantiated resources and services are registered in the resource and service inventory, respectively.

Third Example Use Case—Instantiate a Service

Figure 5:
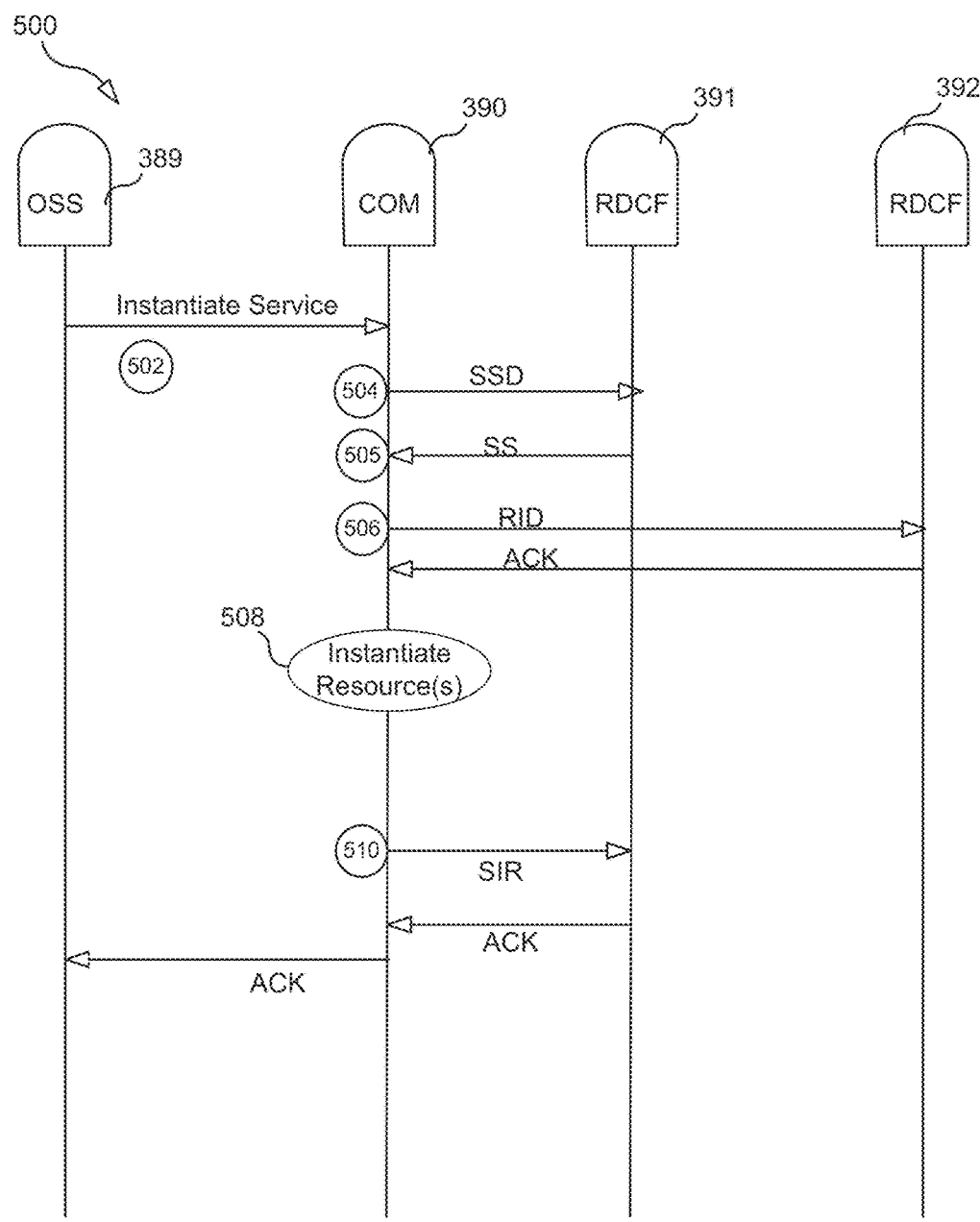

FIG. 5 is a message flow diagram illustrating a process 500 for instantiating a service. In the example shown, process 500 beings with step 502, wherein COM agent 208 receives an Instantiate Service (IS) message transmitted by OSS 389. The IS message comprises a service specification identifier for identifying a service specification corresponding to the service. In step 504, COM agent 208 transmits to RDCF agent 202 a Service Specification Discovery (SSD) message comprising the service specification identifier that was included in the IS message. In step 505, COM agent 208 receives from RDCF 202 the requested service specification (SS). As discussed above, the service specification comprises a set of one or more resource specification identifiers.

As a result of receiving the service specification, COM agent 208 determines, for reach resource specification identifier, whether the resource corresponding to the resource specification identifier has been instantiated (i.e., is operational for the service). This is accomplished by COM agent 208 sending to one or more RDCF agents one or more RID messages. Thus, for example, in step 506, COM agent 208 transmits to an RDCF (in this example it is RDCF 392) a Resource Instance Discovery (RID) message to determine whether the corresponding resource has been instantiated. For any such resource that has not been instantiated, COM agent 208 instantiates the resource (step 508) (e.g., COM agent may perform steps 404-408.

After ensuring that all of the required resources have been instantiated (e.g., after determining that every resource identified by the one or more resource specification identifiers included in the service specification has been instantiated), COM agent 208 registers the service instance by transmitting to RDCF 208 a Service Instance Registration (SIR) message (step 510).

Automated Management (AM)

AM (sometimes referred to as autonomic networks) is about automating the operational support of the network. The aim is to have a policy based control for managing the deployed and instantiated/assigned resources.

Fourth Example Use Case—Policy and Analytics Based Automatic Mgmt

Figure 6:
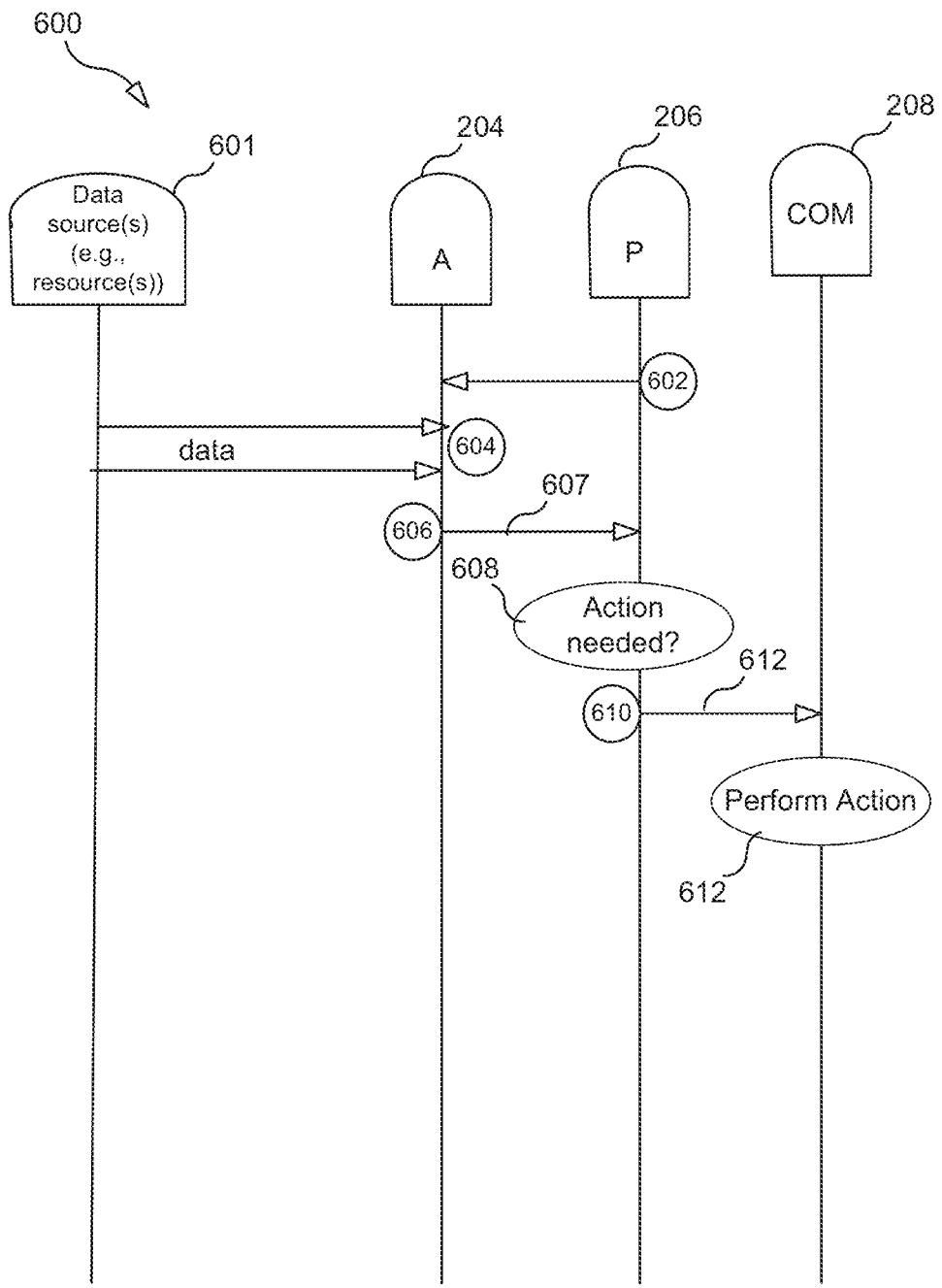

FIG. 6 is a message flow diagram illustrating a process 600 for automatic management of a network. In the example shown, process 600 beings with step 602, wherein policy agent 206 transmits to analytics agent 204 a request for at least one insight (i.e., a report). The request may be a historical insight request message or a real-time insight request message. In step 604, analytics agent 204 receives data from one or more data sources (e.g., one or more resources). In some embodiments, this data includes performance information such as: number of dropped packet; memory utilization; processor utilization; number of simultaneous users; etc. In other embodiments, the data received from a resource includes information pertaining to a possible security threat. Other examples of collected data include: alarms, events from networks such as PDP context establishments, call establishments, call data records, mobility management events (e.g. location update), handover event reporting, etc.

In step 606, analytics agent 204 process the data from the data sources to generate an insight 607 based on the data received from the one or more sources and transmits the insight to policy agent 206, which receives the insight. In some embodiments, the step of transmitting the insight includes one of: transmitting an historical insight delivery message comprising the insight and transmitting a real-time insight delivery message comprising the insight.

In step 608, as a result of receiving the insight (which may include network performance information and/or security information), policy agent 206 determines whether an action is needed based on information included in the insight and a policy. For example, in step 608, policy agent 206 may execute a rule contained in a policy and determine, based on the rule and information in one or more received insights, whether a certain condition has been satisfied (e.g., whether a certain processor utilization has stayed above a certain threshold for at least a certain amount of time). As a result of determining that a network management action should be undertaken, policy agent 206, in step 610, transmits to COM agent 208 an action request 612 (e.g., a "Request Action" message or an "Instantiate Resource" message, defined above) identifying at least one specific action. In step 612, COM agent 208 performs the requested action(s).

Sixth Example Use Case—Cross-Domain Management

This use case is used to illustrate that an analytics agent 704 (see FIG. 7) in one RD may receive insights from other analytics agents (i.e., agents 702 and 204) each of which belongs to an RD different than the RD to which agent 704 belongs, and a policy agent 706 can use insights generated by agent 704 to determine whether an action should be undertaken. Additionally, agents 702 and 204 may belong to different RDs.

Figure 7:
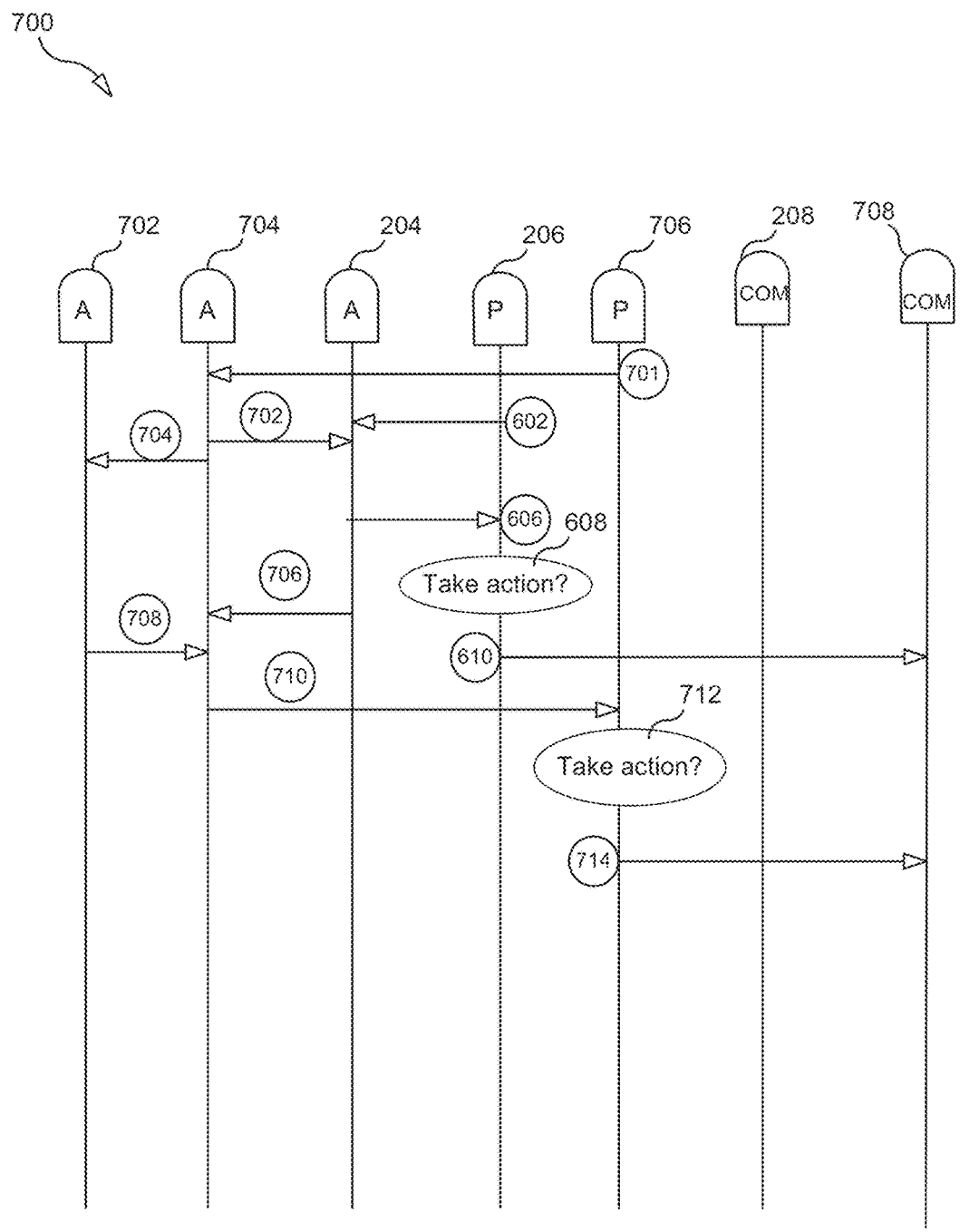

Referring now to FIG. 7, which illustrates an example process 700, in step 701, policy agent 706 transmits to agent 704 a request for at least one insight. In step 702, agent 704 transmits to agent 204 a request for at least one insight (the request may be a historical insight request message or a real-time insight request message). In step 704, agent 704 transmits to agent 702 a request for at least one insight (the request may be a historical insight request message or a real-time insight request message).

In step 706, analytics agent 204 generates an insight based on data received from one or more resources and transmits the insight to analytics agent 704, which receives the insight. In step 708, analytics agent 702 generates an insight based on data received from one or more resources and transmits the insight to analytics agent 704, which receives the insight. In step 710, analytics agent 704 generates an insight based on the insights received in steps 706 and 708 and transmits the generated insight to policy agent 706.

In step 712, as a result of receiving the insight transmitted by agent 704, policy agent 706 determines whether an action is needed based on information in the insight and a policy. As a result of determining that an action should be undertaken, policy agent 706 transmits to COM agent 708 an action request identifying at least one specific action.

In some embodiments, an analytics agent (e.g., agent 204) is configured to transmit to a policy agent (e.g., agent 206) a real-time insight delivery message in response to detecting that a certain condition or event has been detected. For example, in response to detecting that a performance parameter (e.g., a load on a service) has met or exceeded a threshold or in response to detecting some other event or condition.

In some embodiments, policy agent 206 is configured such that, after receiving the real-time insight, the policy agent 206 determines whether more actions should be undertaken (e.g., policy agent execute a policy statement). For example, in response to receiving a real-time insight indicating that a load on a service has met or exceeded a threshold, policy agent 206 may be configured by a policy statement to determine whether resources should be added to the service and may further be configured such that, in response to determining that more resources should be added to the service, the policy agent 206 transmits to a COM agent (e.g., COM agent 208) a message requesting that the COM agent add more resources to the service (e.g., agent 206 transmits to agent 208 an Instantiate Resource message). As another example, in response to receiving a real-time insight indicating that a subscriber notification is required or that a subscriber should be blocked, policy agent 206 may be configured to send a message to a COM agent to cause the COM agent to provide a certain notification to the subscriber or block the subscriber.

Figure 8:
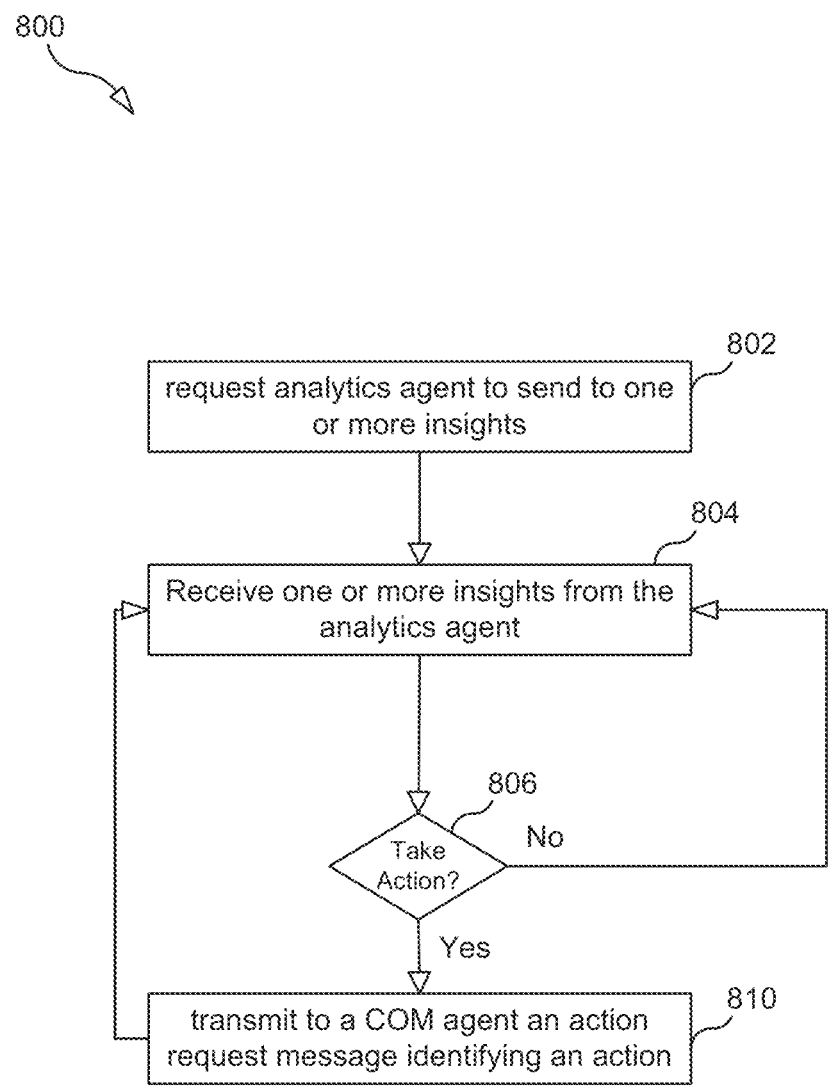
FIG. 8 is a flow chart illustrating a process according to some embodiments.

FIG. 8 is a flow chart illustrating a method 800 in COMPA system 200 comprising, a first analytics agent (e.g., analytics agent 204), a first policy agent (e.g., policy agent 206), and a first COM agent (e.g., COM agent 208). The first analytics agent is configured to collect data from various data sources, process the collected data to generate insights, and provide requested insights to a consuming agent (e.g., a policy agent 206) as a result of receiving from the consuming agent a report request identifying a requested insight type. Process 800 may begin in step 802, where the first policy agent requests the first analytics agent to send to the first policy agent one or more insights. In step 804, the first policy agent, in response to receiving a set of one or more insights from the first analytics agent, uses a policy statement and the set of one or more insights to determine whether a first action should be taken. In step 806, as a result of determining the first action should be taken, the first policy agent transmits to the first COM agent a first action request message for identifying the first action, the first COM agent being configured such that, in response to receiving the first action request message, the first COM agent performs the requested first action.

In some embodiments, method 800 includes additional steps (see e.g., FIG. 7). For example, method 800 may further include: a second analytics agent (e.g., analytics agent 702) collecting data from various data sources, processing the collected, and providing requested insights; and a third analytics agent (e.g., analytics agent 704) requesting the first analytics agent to send to the third analytics agent one or more insights generated by the first analytics agent and requesting the second analytics agent to send to the third analytics agent one or more insights generated by the second analytics agent. The method may further include the third analytics agent generating at least one insight based at least in part on one or more insights transmitted to the third analytics agent from the first analytics agent and one or more insights transmitted to the third analytics agent from the second analytics agent.

In some embodiments, the method also includes a second policy agent (e.g., policy agent 706) requesting the third analytics agent to send to the second policy agent one or more insights generated by the third analytics agent based at least in part on one or more insights transmitted to the third analytics agent from the first analytics agent and one or more insights transmitted to the third analytics agent from the second analytics agent. The second policy agent, in response to receiving a set of one or more insights from the third analytics agent, may use a policy and the set of one or more insights received from the third analytics agent to determine whether a second action should be taken, and, as a result of determining the second action should be taken, transmits to a second COM agent (e.g. COM agent 708) a second action request message for identifying the second action, and the second COM agent is configured such that, in response to receiving the second action request message, the second COM agent performs the requested second action.

Figure 9:
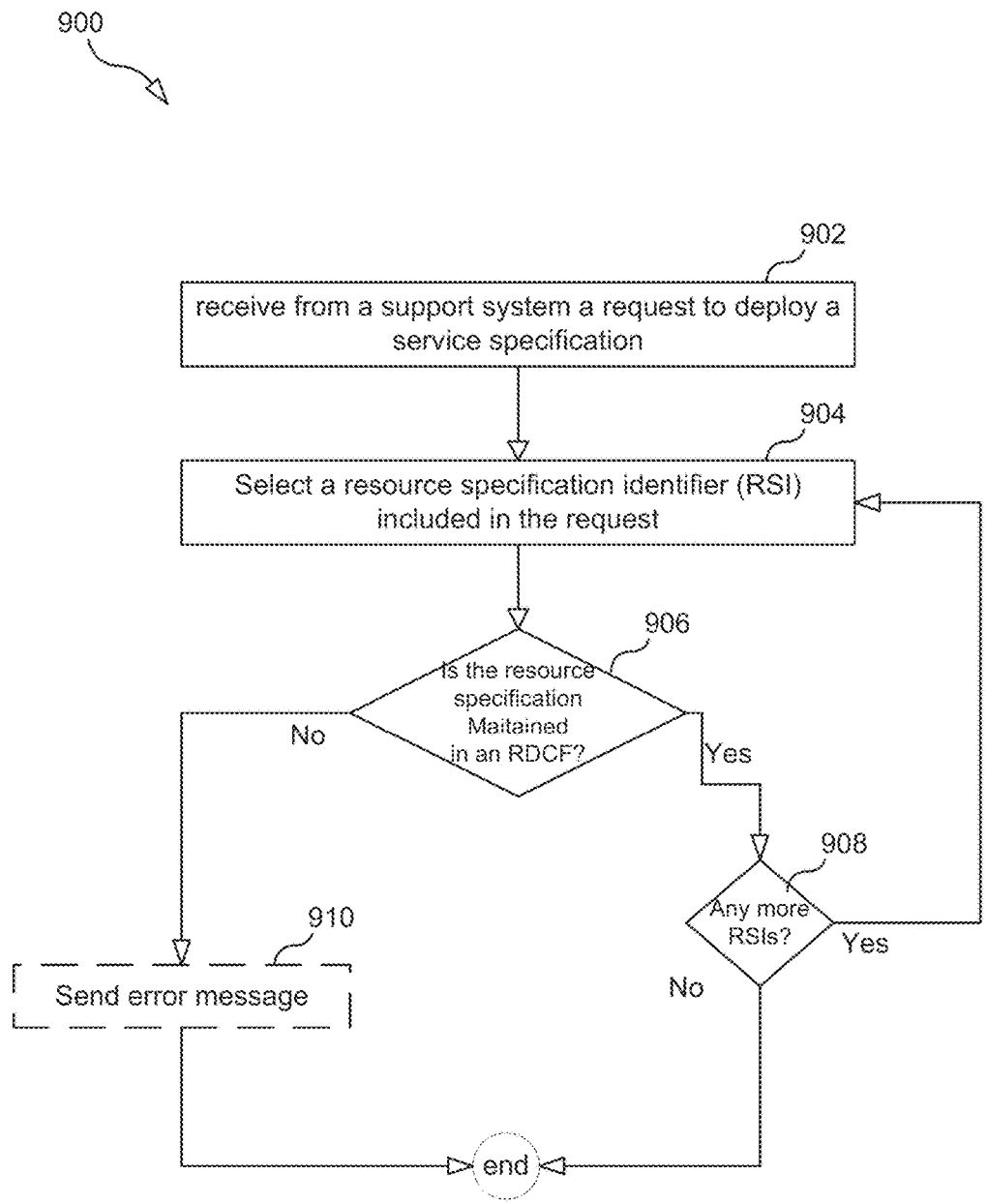
FIG. 9 is a flow chart illustrating a process according to some embodiments.

FIG. 9 is a flow chart illustrating a process 900 for service onboarding, according to some embodiments. Process 900 may being with step 902, in which a first COM agent (e.g., COM agent 208) receives from a support system a first request to deploy a service specification. The first request to deploy the service specification includes a service descriptor for the service, the service descriptor includes a set of one or more resource specification identifiers including a first resource specification identifier. Each resource specification identifier included in the set of resource specification identifiers identifies a particular resource specification. The first resource specification identifier identifies a first resource specification that is maintained by a first RDCF agent (e.g., RDCF agent 202). In step 904, the first COM agent, in response to receiving the first request to deploy the service specification, selects a resource specification identifier (RSI) from the set of RSIs. In step 906, the first COM agent, determines whether the resource specification identified by the selected RSI is maintained by at least one RDCF agent. If not, the process may proceed to step 910, where the first COM agent transmits an error message to the support system, otherwise the process proceeds to step 908 in which the first COM agent determines whether it has selected each one of the RSIs included in the set of RSI. If one or more RSIs in the set have not yet been selected, the process goes back to step 904.

Figure 10:
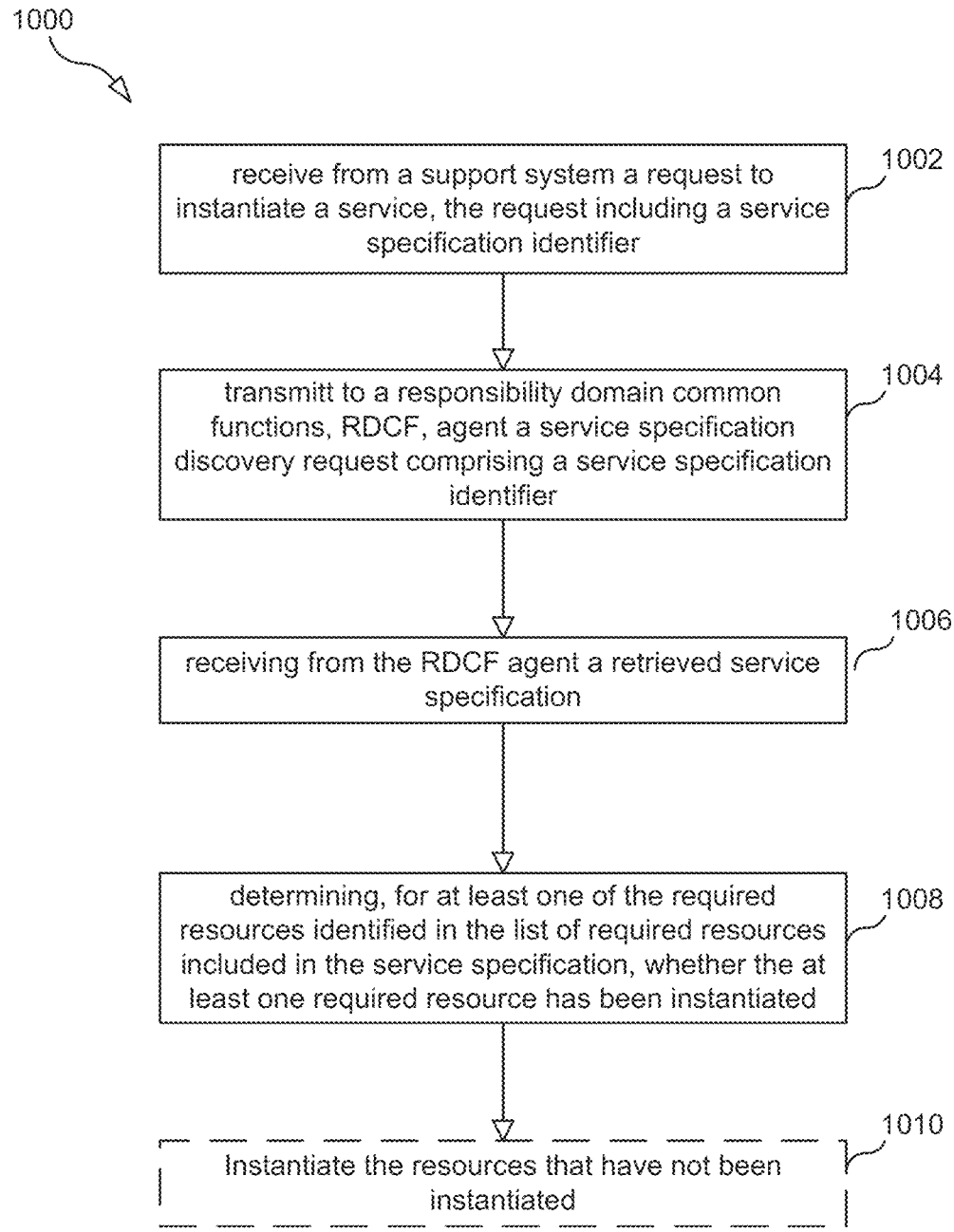
FIG. 10 is a flow chart illustrating a process according to some embodiments.

FIG. 10 is a flow chart illustrating a process 1000 for automatic product offering. Process 1000 may begin with step 1002 in which the first COM agent receives from a support system a first request to instantiate a service. The first request to instantiate the service includes a service specification identifier identifying a service specification that includes a list of required resources. In step 1004, the first COM agent, in response to receiving the first request to instantiate the service, transmits to the RDCF agent a service specification discovery request that includes the service specification identifier. The RDCF agent is configured such that, in response to receiving the service specification discovery request comprising the service specification identifier, the RDCF agent uses the service specification identifier to retrieve the service specification identified by the service specification identifier and transmit the retrieved service specification to the first COM agent. In step 1006, the first COM agent receives from the RDCF agent the retrieved service specification. In step 1008, the first COM agent, in response to receiving the service specification from the RDCF agent, determines, for at least one of the required resources identified in the list of required resources included in the service specification, whether the at least one required resource has been instantiated. In step 1010 (optional), the COM agent instantiates one or more of the required resources that are not already instantiated (e.g., the COM agents performs steps 404-408).

Figure 11:
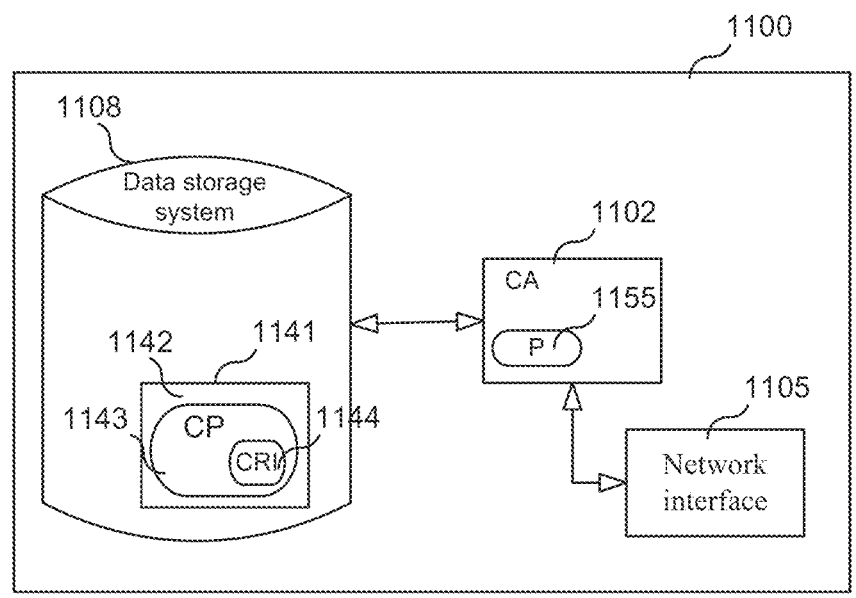
FIG. 11 is a block diagram of an apparatus for implementing one or more agents.

FIG. 11 is a block diagram of a computer system 1100 for implementing one or more of the above described agents. That is, in some embodiments, for each of the above described agents, the network 100 has a separate computer system 1100 for implementing the agent, but in other embodiments, one or more agents may be implemented using only a single computer system 1100. As described below, computer system 1100 may consists of a single computer apparatus or set of computer apparatuses (i.e., computer system 1100 may be a cloud computing system).

As shown in FIG. 11, computer system 1100 includes at least one computer apparatus (ca) 1102, which may include one or more processors 1155 (e.g., one or more general purpose microprocessors and/or one or more data processing circuits, such as an application specific integrated circuit (ASIC), field-programmable gate arrays (FPGAs), logic circuits, and the like). In some embodiments, computer system 1102 includes a plurality of CAs 1102, which may or may not be co-located. Thus, the above described agents may be implemented in a cloud computing environment. In some embodiments, each agent may correspond to a virtual machine that hosted by computer system 1100. Computer system 1100 further includes: a network interface 1105 for use in transmitting and receiving data via a communications link; and a data storage system 1108, which may include one or more non-volatile storage devices and/or one or more volatile storage devices (e.g., random access memory (RAM)). In embodiments where computer apparatus 1102 includes a microprocessor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, but not limited to magnetic media (e.g., a hard disk), optical media (e.g., a DVD), memory devices (e.g., random access memory), and the like, but not a signal. In some embodiments, the CRI of computer program 1143 is configured such that when executed by data processing system 1102, the CRI causes the computer apparatus 1102 to perform steps described above. In other embodiments, apparatus 1102 may be configured to perform steps described herein without the need for code. That is, for example, apparatus 1102 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A control, orchestration, management, policy and analytics (COMPA) system, comprising:
   a first analytics agent configured to: collect data from various data sources, process collected data into insights, and provide requested insights to a consuming agent in response to receiving from the consuming agent a report request identifying a requested insight type;
   a first policy agent configured to request the first analytics agent to send to the first policy agent one or more insights; and
   a first control orchestration management (COM) agent, wherein
   the first policy agent is configured such that, in response to receiving a set of one or more insights from the first analytics agent, the first policy agent uses a policy and the one or more insights to determine whether a first action should be taken, and, as a result of determining the first action should be taken, transmits to the first COM agent a first action request message for identifying the first action,
   the first COM agent is configured such that, in response to receiving the first action request message, the first COM agent performs the requested first action, and the COMPA system further comprises:
   a second analytics agent configured to: collect data from various data sources, process collected data into insights, and provide requested insights to a consuming agent in response to receiving from the consuming agent a report request identifying a requested insight type; and
   a third analytics agent configured to: 1) request the first analytics agent to send to the third analytics agent one or more insights generated by the first analytics agent, 2) request the second analytics agent to send to the third analytics agent one or more insights generated by the second analytics agent, and 3) generate at least one insight based at least in part on one or more insights transmitted to the third analytics agent from the first analytics agent and one or more insights transmitted to the third analytics agent from the second analytics agent.

2. The COMPA system of claim 1, further comprising a second policy agent configured to request the third analytics agent to send to the second policy agent one or more insights generated by the third analytics agent based at least in part on one or more insights transmitted to the third analytics agent from the first analytics agent and one or more insights transmitted to the third analytics agent from the second analytics agent.

3. The COMPA system of claim 2, further comprising a second COM agent, wherein
   the second policy agent is configured such that, in response to receiving a set of one or more insights from the third analytics agent, the second policy agent uses a policy and the one or more insights received from the third analytics agent to determine whether a second action should be taken, and, as a result of determining the second action should be taken, transmits to the second COM agent a second action request message for identifying the second action, and
   the second COM agent is configured such that, in response to receiving the second action request message, the second COM agent performs the requested second action.

4. The COMPA system of claim 3, wherein
   the COMPA system comprises a plurality of responsibility domains (RDs) comprising a first RD and a second RD,
   the first analytics agent, the first policy agent, and the first COM agent are part of the first RD but not part of the second RD, and
   the third analytics agent, the second policy agent, and the second COM agent are part of the second RD but not part of the first RD.

5. The COMPA system of claim 4, wherein the plurality of RDs further comprises a third RD and the second analytics agent is a part of the third RD but is not a part of the first or second RD.

6. The COMPA system of claim 1, wherein the first policy agent is configured to request the first analytics agent to send to the first policy agent one or more insights by transmitting to the first analytics agent a report request message comprising:
   a report type identifier identifying a requested report type; and
   time interval information specifying the periodicity with which the first analytics agent should send to the first policy agent a report of the requested report type.

7. The COMPA system of claim 6, wherein the report request message further comprises an object identifier specifying a target object.

8. The COMPA system of claim 7, wherein the target object is one of: an identified subscriber, an identified group of subscribers, an identified service, and an identified network element.

9. The COMPA system of claim 1, wherein
the first analytics agent is configured to transmit to the first policy agent a real-time insight in response to detecting that a load on a service has met or exceeded a threshold;
the first policy agent is configured such that, after receiving the real-time insight, the first policy agent determines whether more resources should be added to the service; and
the first policy agent is configured such that, in response to determining that more resources should be added to the service, the first policy agent transmits to the first COM agent a message requesting that the first COM agent add more resources to the service.

10. A method in a control, orchestration, management, policy and analytics (COMPA) system comprising, a first analytics agent, a first policy agent, and a first control orchestration management (COM) agent, wherein the first analytics agent is for collecting data from various data sources, processing the collected data to generate insights, and providing requested insights to a consuming agent as a result of receiving from the consuming agent a report request identifying a requested insight type, the method comprising:
the first policy agent requesting the first analytics agent to send to the first policy agent one or more insights;
the first policy agent, in response to receiving a set of one or more insights from the first analytics agent, using a policy statement and the set of one or more insights to determine whether a first action should be taken;
as a result of determining the first action should be taken, the first policy agent transmitting to the first COM agent a first action request message for identifying the first action, the first COM agent being configured such that, in response to receiving the first action request message, the first COM agent performs the requested first action;
a second analytics agent collecting data from various data sources, processing the collected, and providing requested insights; and
a third analytics agent requesting the first analytics agent to send to the third analytics agent one or more insights generated by the first analytics agent;
the third analytics agent requesting the second analytics agent to send to the third analytics agent one or more insights generated by the second analytics agent; and
the third analytics agent generating at least one insight based at least in part on one or more insights transmitted to the third analytics agent from the first analytics agent and one or more insights transmitted to the third analytics agent from the second analytics agent.

11. The method of claim 10, further comprising:
a second policy agent requesting the third analytics agent to send to the second policy agent one or more insights generated by the third analytics agent based at least in part on one or more insights transmitted to the third analytics agent from the first analytics agent and one or more insights transmitted to the third analytics agent from the second analytics agent.

12. The method of claim 11, further comprising:
the second policy agent, in response to receiving a set of one or more insights from the third analytics agent, using a policy and the set of one or more insights received from the third analytics agent to determine whether a second action should be taken, and, as a result of determining the second action should be taken, transmitting to a second COM agent a second action request message for identifying the second action, and
the second COM agent is, in response to receiving the second action request message, performing the requested second action.

13. The method of claim 12, wherein
the first analytics agent, the first policy agent, and the first COM agent are part of a first responsibility domain (RD), and
the third analytics agent, the second policy agent, and the second COM agent are part of a second RD.

14. The method of claim 13, wherein the second analytics agent is a part of a third RD.

15. The method of claim 10, further comprising:
the first policy agent requests the first analytics agent to send to the first policy agent one or more insights by transmitting to the first analytics agent a report request message comprising:
a report type identifier identifying a requested report type; and
time interval information specifying the periodicity with which the first analytics agent should send to the first policy agent a report of the requested report type.

16. The method of claim 15, wherein the report request message further comprises an object identifier specifying a target object.

17. The method of claim 16, wherein the target object is one of: an identified subscriber, an identified group of subscribers, an identified service, and an identified network element.

18. The method of claim 10, further comprising:
the first analytics agent transmitting to the first policy agent a real-time insight in response to detecting that a load on a service has met or exceeded a threshold;
the first policy agent, after receiving the real-time insight, determining whether more resources should be added to the service; and
the first policy agent, in response to determining that more resources should be added to the service, transmitting to the first COM agent a message requesting that the first COM agent add more resources to the service.

19. A policy agent configured to perform the method of claim 10.

20. A computer program, comprising instructions which, when executed on at least one processor, cause the at least one processor to carry out the method according to claim 10.

* * * * *